(12) United States Patent
Kubo

(10) Patent No.: US 9,304,366 B2
(45) Date of Patent: Apr. 5, 2016

(54) LIQUID CRYSTAL DISPLAY DEVICE

(71) Applicant: Japan Display Inc., Tokyo (JP)

(72) Inventor: Kiichirou Kubo, Mobara (JP)

(73) Assignee: Japan Display Inc., Tokyo (JP)

( * ) Notice: Subject to any disclaimer, the term of this patent is extended or adjusted under 35 U.S.C. 154(b) by 312 days.

(21) Appl. No.: 13/653,286

(22) Filed: Oct. 16, 2012

(65) Prior Publication Data

US 2013/0093972 A1 Apr. 18, 2013

(30) Foreign Application Priority Data

Oct. 18, 2011 (JP) ................... 2011-228455

(51) Int. Cl.
*G02F 1/1345* (2006.01)
*G02F 1/1333* (2006.01)

(52) U.S. Cl.
CPC ...... *G02F 1/13454* (2013.01); *G02F 1/133308* (2013.01); *G02F 2001/13332* (2013.01); *G02F 2001/133322* (2013.01); *G02F 2201/54* (2013.01)

(58) Field of Classification Search
CPC ............ G02F 1/133308; G02F 1/1354; G02F 1/1358; G02F 2001/13332; G02F 2001/133322; G02F 1/133328

USPC ...................... 349/58–60, 149–152
See application file for complete search history.

(56) References Cited

U.S. PATENT DOCUMENTS

| 7,714,952 B2* | 5/2010 | Chang .......................... 349/58 |
| 8,059,227 B2* | 11/2011 | Shin .............................. 349/58 |
| 2008/0013030 A1 | 1/2008 | Fujita | |

FOREIGN PATENT DOCUMENTS

JP 2008-20836 1/2008

* cited by examiner

*Primary Examiner* — Dung Nguyen
(74) *Attorney, Agent, or Firm* — Ulmer & Berne LLP

(57) ABSTRACT

An object of the present invention is to eliminate COG irregularities around a display area caused by distortion of a glass substrate generated when IC chips are connected by a COG method in a liquid crystal display device. A liquid crystal display panel configured using an opposed substrate and a TFT substrate and a backlight are accommodated using an upper frame and a lower frame. IC chips are connected to an end portion of the TFT substrate of the liquid crystal display panel via ACFs by the COG method. Protrusions formed at the upper frame are in contact with the both sides of each IC chip, and the distortion of the TFT substrate generated by the COG method is eliminated by the protrusions. The TFT substrate can be flattened by eliminating the distortion, and the COG irregularities around the display area can be suppressed.

18 Claims, 9 Drawing Sheets

A-A

E-E

F-F

LIQUID CRYSTAL DISPLAY DEVICE

CLAIM OF PRIORITY

The present application claims priority from Japanese Patent Application JP 2011-228455 filed on Oct. 18, 2011, the content of which is hereby incorporated by reference into this application.

BACKGROUND OF THE INVENTION (1) Field of the Invention

The present invention relates to a liquid crystal display device, and particularly to a liquid crystal display device for which measures against display irregularities generated when semiconductor chips are mounted on a substrate are taken.

(2) Description of the Related Art

In a liquid crystal display device, provided are a TFT substrate on which pixel electrodes and thin-film transistors (TFTs) are formed in a matrix shape, and an opposed substrate which faces the TFT substrate and on which color filters are formed at positions corresponding to the pixel electrodes of the TFT substrate. In addition, liquid crystal is sandwiched between the TFT substrate and the opposed substrate. The transmittance of light by liquid crystal molecules is controlled for each pixel to form an image.

A liquid crystal display device is flat and light, and has been widely used in various fields, for example, a large-sized display device such as a TV, a middle-sized display device such as a monitor, and a small-sized display device such as a cellular phone or a DSC (Digital Still Camera). In particular, demand for liquid crystal display devices used in tablet liquid crystal modules has been increased.

In a liquid crystal display device, mounted are IC chips for driving scanning lines or video signal lines. In recent years, the IC chips are attached to the TFT substrate or the opposed substrate as a glass substrate by thermocompression bonding via anisotropic conductive films (ACPs). The temperature at this time is about 180° C. Such a method of mounting the IC chips is referred to as COG (Chip On Glass).

In the case of thermocompression bonding, the temperature of the IC chips differs from that of the glass substrate due to a difference between the heat capacity of the IC chips and that of the glass substrate. Thus, when the temperature is lowered, distortion of the glass substrate is generated. Further, the distortion of the glass substrate is generated after thermocompression bonding due to a difference between the coefficient of thermal expansion of the glass substrate and that of the IC chips. The coefficient of thermal expansion of glass is, for example, $3.8 \times 10^{-6}$, and the coefficient of thermal expansion of the IC chips is $2.5 \times 10^{-6}$. As described above, if the distortion of the glass substrate is generated, display irregularities are generated on a display area due to the effects of the distortion. Such display irregularities are referred to as COG irregularities in the description.

In order to suppress such distortion of the glass substrate, Japanese Patent Application Laid-Open No. 2008-20836 describes a configuration in which deformation suppression members in various shapes are attached between IC chips and an end portion of an opposed substrate. Metal or ceramics that is higher in rigidity than a glass substrate is used for such deformation suppression members.

In the technique described in Japanese Patent Application Laid-Open No. 2008-20836, rigid bodies are used to suppress the deformation of the glass substrate. However, since the rigid bodies are attached to the glass substrate using adhesive material, there is a possibility that distortion of glass is generated by the deformation suppression members depending on an attaching method or material. Further, the size and material of the rigid bodies are restricted in order to secure sufficient rigidity to suppress the deformation of glass.

FIG. 14 shows an example of irregularities to be eliminated by the present invention in a liquid crystal display device. In FIG. 14, a display area 11 surrounded by an, upper frame 10 is shown using white and COG irregularities 12 are shown by the hatching. However, the COG irregularities 12 are distinguished on a real black screen as shown by the hatching in FIG. 14. Specifically, the COG irregularities 12 are distinguished as black patterns on a black screen.

In FIG. 14, two IC chips 30 are mounted on each of a short side and a long side by the COG method on the upper side of the TFT substrate 100 or on the lower side of the opposed substrate 200 under the upper frame 10. The chips on the short side are those for driving scanning lines, and the chips on the long side are those for driving video signal lines.

FIG. 15 is a diagram obtained by removing the TFT substrate 100 and the opposed substrate 200 of FIG. 14. The TFT substrate 100 and the opposed substrate 200 adhere to each other through seal material (not shown). Liquid crystal is sandwiched between the TFT substrate 100 and the opposed substrate 200. Such a configuration is referred to as a liquid crystal display panel in the description. It should be noted that a polarizing plate is not shown in FIG. 15.

In FIG. 15, video signal line driving IC chips 30 are mounted at an end portion of the TFT substrate 100, and scanning line driving IC chips 30 are mounted at an end portion of the opposed substrate 200. These chips are connected to glass substrates by the COG method. The video signal line driving IC chips 30 are connected on the upper side of the TFT substrate 100, and the scanning line driving IC chips 30 are connected on the lower side of the opposed substrate 200. The length, width, and thickness of each IC chip are, for example, 13 mm, 1.5 mm, and 0.35 mm, respectively. Further, an interval d between the IC chips in FIG. 15 is, for example, 12 mm.

FIG. 16 is a cross-sectional view taken along the line E-E of FIG. 15. In FIG. 16, the IC chips 30 are mounted via ACFs 35 by the COG method. Areas of the TFT substrate 100 where the IC chips 30 are mounted are deformed to be in an upward convex shape on the both sides of each IC chip 30 as shown in FIG. 16. As described above, the deformation of the TFT substrate 100 has an impact on the display area 11 to generate the COG irregularities 12 as shown on the long side of the display area 11 of FIG. 14.

FIG. 17 is a cross-sectional view taken along the line F-F of FIG. 15. In FIG. 17, the IC chips 30 are mounted via the ACFs 35 by the COG method. Areas of the opposed substrate 200 where the IC chips 30 are mounted are deformed to be in a downward convex shape on the both sides of each IC chip 30 as shown in FIG. 17. As described above, the deformation of the opposed substrate 200 has an impact on the display area 11 to generate the COG irregularities 12 as shown on the short side of the display area 11 of FIG. 14.

An object of the present invention is to suppress the COG irregularities 12 as shown in FIG. 14 in the liquid crystal display device in which the IC chips 30 are mounted by the COG method.

SUMMARY OF THE INVENTION

The present invention solves the above-described problem, and a main aspect is as follows. Specifically, there is provided a liquid crystal display device in which a backlight is arranged on a back surface of a liquid crystal display panel formed by sandwiching a liquid crystal layer between a TFT substrate on which pixel electrodes and opposed electrodes are formed and an opposed substrate on which color filters are formed, wherein the liquid crystal display panel and the backlight are accommodated using an upper frame and a lower frame, IC chips are connected to an end portion of the TFT substrate by a COG method, and protrusions formed at the upper frame are in contact with the TFT substrate on at least one side of each IC chip.

According to another main aspect, there is provided a liquid crystal display device wherein the protrusions formed at the upper frame are in contact with the TFT substrate on the both sides of each IC chip.

According to still another main aspect, there is provided a liquid crystal display device according to the first or second aspect, wherein the protrusions are formed integrally with the upper frame by pressing, or the protrusions are made of resin formed integrally with the upper frame.

According to still another main aspect of the present invention, there is provided a liquid crystal display device in which a backlight is arranged on a back surface of a liquid crystal display panel formed by sandwiching a liquid crystal layer between a TFT substrate on which pixel electrodes and opposed electrodes are formed and an opposed substrate on which color filters are formed, wherein the liquid crystal display panel and the backlight are accommodated using an upper frame and a lower frame, the backlight is accommodated in a middle frame, IC chips are connected to an end portion of the TFT substrate by a COG method, protrusions formed at the upper frame are in contact with the TFT substrate on at least one side of each IC chip, the IC chips are connected to an end portion of the opposed substrate by the COG method, and the protrusions formed at the middle frame are in contact with the opposed substrate on at least one side of each IC chip.

According to the present invention, distortion of the TFT substrate or the opposed substrate generated by the COG connection can be eliminated, and thus the COG irregularities in the display area can be suppressed. Further, according to the present invention, force in the direction opposed to the distortion generated by the COG connection is applied to adjust the substrate, and thus the distortion can be effectively eliminated.

Further, the present invention eliminates the distortion of the TFT substrate or the opposed substrate using the protrusions that are formed integrally with the upper frame or the middle frame, and thus an increase in the manufacturing cost caused by elimination of the distortion can be suppressed.

DETAILED DESCRIPTION OF THE EMBODIMENT

Hereinafter, the content of the present invention will be described in detail using embodiments.

[First Embodiment]

Figure 1:
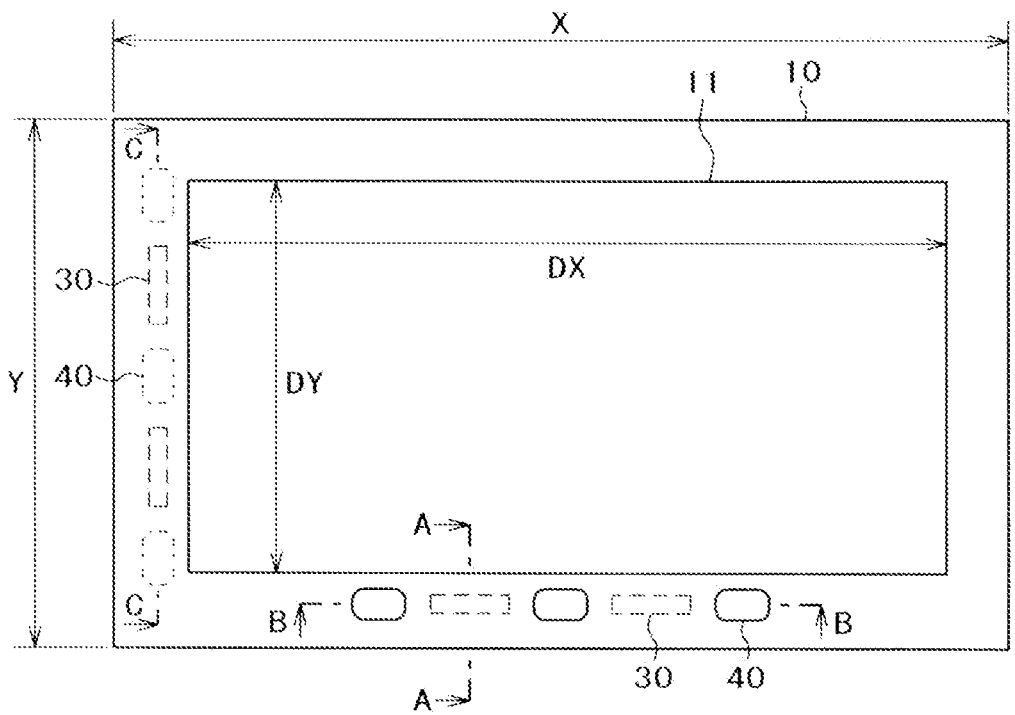
FIG. 1 is a front view of a liquid crystal display device of a first embodiment.
Figure 15:
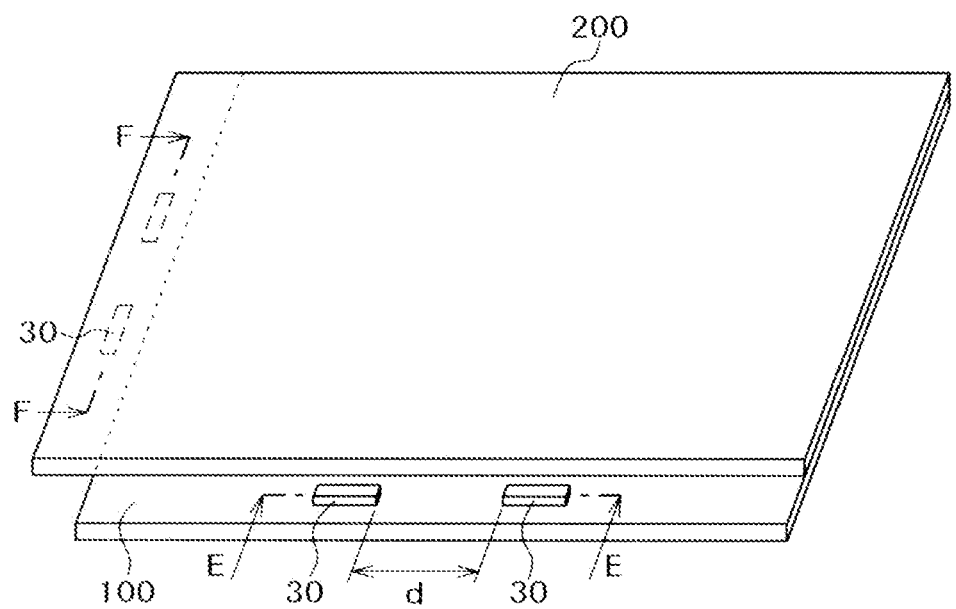
FIG. 15 is a perspective view of a liquid crystal display panel in which IC chips are connected by a COG method.

FIG. 1 is a front view of a liquid crystal display device according to the present invention. In FIG. 1, a liquid crystal display panel formed by combining a TFT substrate 100 (first substrate) and an opposed substrate 200 (second substrate) as shown in FIG. 15 is arranged under an upper frame 10. Further, as similar to FIG. 15, IC chips 30 are mounted at an end portion of a main surface of the TFT substrate 100 and an end portion of a main surface of the opposed substrate 200. In FIG. 1, for example, X is 170 mm and Y is 110 mm as the external dimension of the liquid crystal display device, and for example, DX is 155 mm and DY is 95 mm as the size of the display area.

Figure 16:
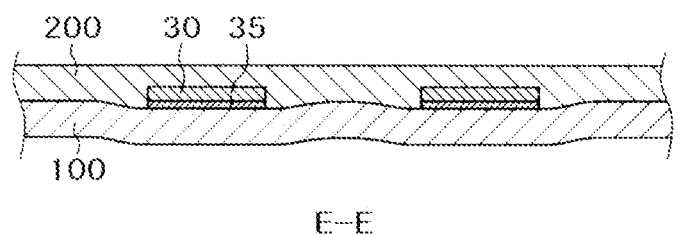
FIG. 16 is a cross-sectional view taken along the line E-E of FIG. 15.

In FIG. 1, downward protrusions 40 are formed on the long side of the upper frame 10 to prevent deformation of an end portion of the TFT substrate 100 generated by the COG method. The protrusions 40 serve to suppress convex portions of the TFT substrate 100 generated by the effects of the COG on the both sides of each IC chip 30 as shown in FIG. 16. Specifically, the protrusions 40 serve to flatten the TFT substrate 100 on which the IC chips 30 are mounted.

Figure 17:
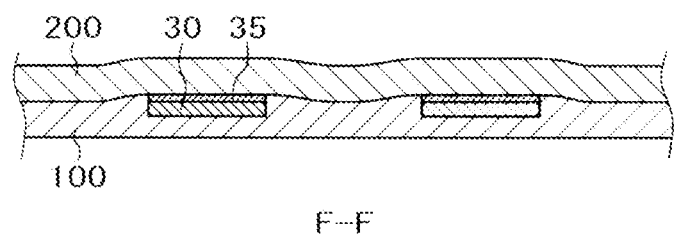
FIG. 17 is a cross-sectional view taken along the line F-F of FIG. 15.

Further, convex portions are generated by the effects of the COG on the both sides of each IC chip 30 on the short side of the opposed substrate 200 as shown in FIG. 17. However, the protrusions 40 formed at a middle frame 60, to be described later, are in contact with the convex portions to suppress them. The protrusions 40 of the middle frame 60 are represented by dotted lines in FIG. 1. Specifically, the protrusions 40 of the middle frame 60 serve to flatten the opposed substrate 200 on which the IC chips 30 are mounted.

Figure 2:
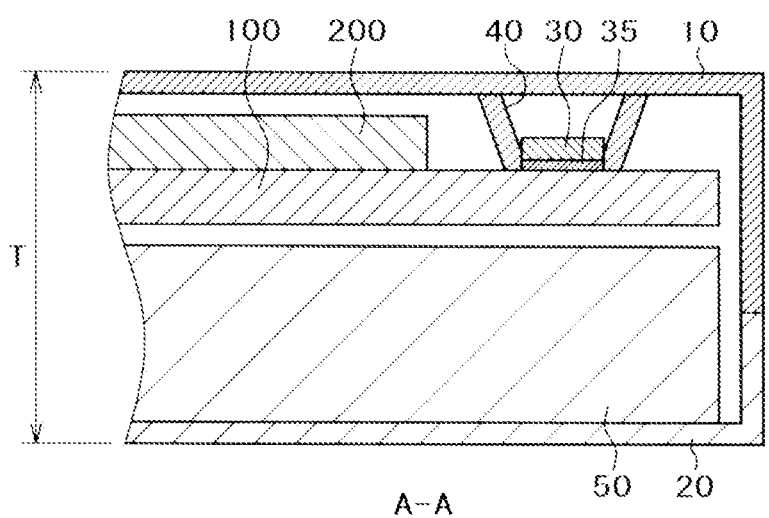
FIG. 2 is a cross-sectional view taken along the line A-A of FIG. 1.

FIG. 2 is a cross-sectional view taken along the line A-A of FIG. 1. In FIG. 2, the liquid crystal display panel is mounted on a backlight 50, and the entirety thereof is surrounded by the upper frame 10 and a lower frame 20. In FIG. 2, each IC chip 30 is connected to the TFT substrate 100 via an ACF 35 by the COG method. Each of the protrusions 40 formed at the upper frame 10 is in contact with the TFT substrate 100 on the back side of the drawing, namely, on the right side of each IC chip 30 of FIG. 1 so as to suppress the convex portions generated on the TFT substrate 100. In FIG. 2, each thickness of the upper frame 10 and the lower frame 20 is, for example, 0.4 mm. Further, the thickness T of the liquid crystal display device is, for example, 10 mm in FIG. 2.

Figure 3:
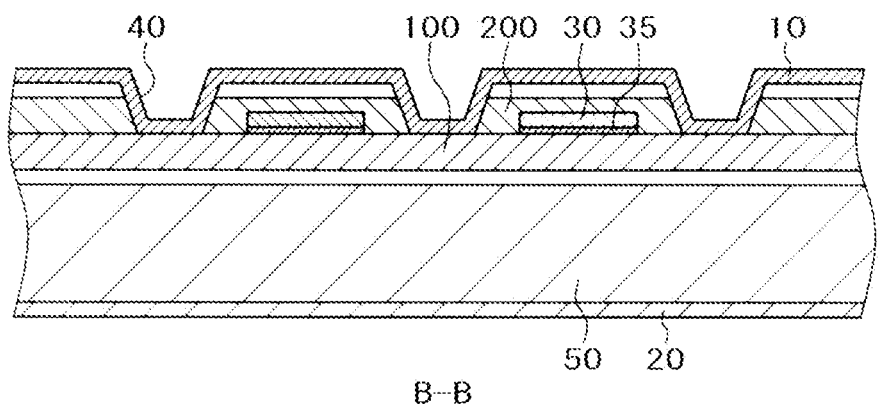
FIG. 3 is a cross-sectional view taken along the line B-B of FIG. 1.

FIG. 3 is a cross-sectional view taken along the line B-B of FIG. 1. In FIG. 3, the backlight 50 is accommodated in the lower frame 20, and the liquid crystal display panel is installed on the backlight 50. Each IC chip 30 is connected to the TFT substrate 100 via the ACF 35 by the COG method. In FIG. 3, the liquid crystal display panel is covered with the upper frame 10. The protrusions 40 are formed at the upper frame 10, and flatten the TFT substrate 100 by suppressing the convex portions generated by the COG method as shown in FIG. 16.

In FIG. 3, two IC chips 30 are mounted, and the convex portions of the TFT substrate 100 are generated on the both sides of the IC chips 30, namely, at three positions. Thus, the protrusions 40 of the upper frame 10 are accordingly formed at three positions. The protrusions 40 of the upper frame 10 are configured to press the convex portions of the TFT substrate 100 downward by about, for example, 0.1 mm.

Figure 4:
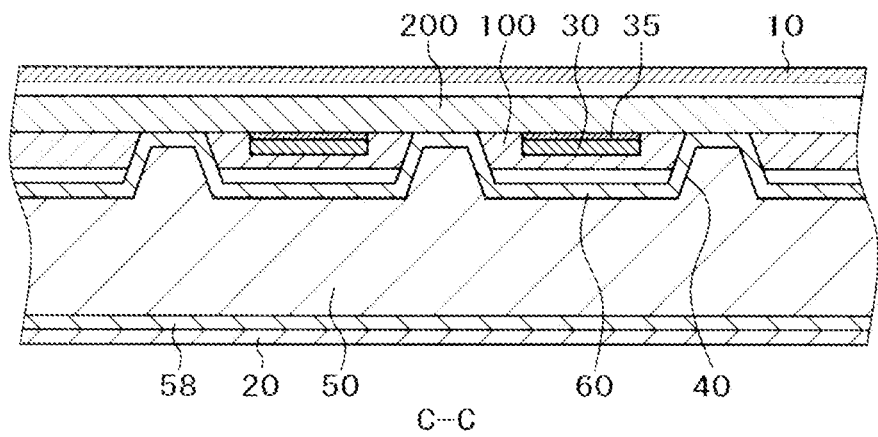
FIG. 4 is a cross-sectional view taken along the line C-C of FIG. 1.

FIG. 4 is a cross-sectional view taken along the line C-C of FIG. 1. In FIG. 4, the backlight 50 is accommodated in the lower frame 20. Unlike FIG. 2 and FIG. 3, a reflective sheet 58 and the middle frame 60 are mounted on the backlight 50 in FIG. 4. Constitutional elements of the backlight 50, to be described later, are arranged between the middle frame 60 and the reflective sheet 58. The liquid crystal display panel is arranged on the backlight 50, and is covered with the upper frame 10.

In FIG. 4, each IC chip 30 is connected to a bottom surface of the opposed substrate 200 via the ACF 35 by the COG method. Downward convex portions as shown in FIG. 17 are generated on the opposed substrate 200 by the COG connection of the IC chips 30. The protrusions 40 are formed at the middle frame 60 so as to press down the convex portions generated on the opposed substrate 200. As a result, areas of the opposed substrate 200 where the IC chips 30 are arranged are also flattened. The protrusions 40 formed at the middle frame 60 press down the convex portions of the opposed substrate 200 by, for example, 0.1 mm.

Figure 5A:
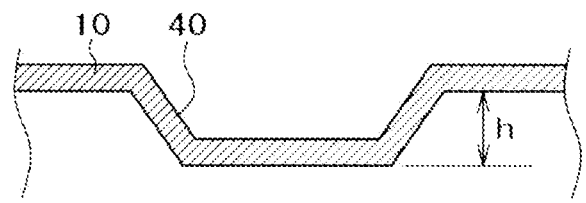
FIGS. 5A and 5B are detailed views of a protrusion formed at an upper frame.
Figure 5B:
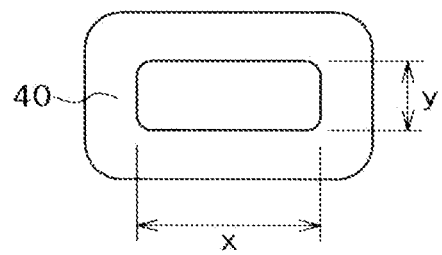

FIGS. 5A and 5B show an example of the protrusion 40 formed at the upper frame 10. FIG. 5A is a cross-sectional view of the protrusion 40, and FIG. 5B is a bottom view thereof. As shown in FIG. 5A, the cross-section of the protrusion 40 is formed in a trapezoidal shape, and the upper base of the trapezoid that is in a planar shape is in contact with a glass substrate. The protrusion 40 as shown in FIGS. 5A and 5B can be formed by pressing at the same time when the upper frame 10 is formed.

For example, the height h of the protrusion 40 is equal to the gap between the upper frame 10 and the TFT substrate 100 where no IC chip 30 is formed. With this configuration, the convex portions of the TFT substrate 100 where the IC chips 30 are connected are pressed down by the protrusions 40 formed at the upper frame 10, so that the convex portions of the TFT substrate 100 can be substantially flattened. The protrusions 40 of the upper frame 10 press down the TFT substrate 100 by, for example, about 0.1 mm. Further, the height h of the protrusion 40 in FIGS. 5A and 5B is, for example, 0.8 to 0.9 mm.

As shown in FIG. 5B, the bottom surface of the protrusion 40 is flattened. Accordingly, even when the positions of the convex portions of the TFT substrate 100 and those of the protrusions 40 of the upper frame 10 vary, the protrusions 40 of the upper frame 10 can be stably brought into contact with the convex portions of the TFT substrate 100. x of the flattened portion of the protrusion 40 in FIG. 5B is, for example, about 3 to 5 mm, and y is, for example, about 2 to 3 mm.

Figure 6:
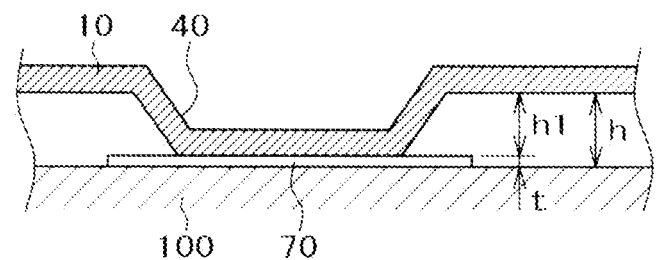
FIG. 6 shows another example of a mode in which the protrusion formed at the upper frame is in contact with a TFT substrate.

The upper frame 10 is generally made of metal. Direct contact of metal with a glass substrate causes a glass crack in some cases. In order to prevent this, a spacer 70 can be arranged between the surface of the glass and the protrusion 40 of the upper frame 10 as shown in FIG. 6. The spacer 70 is formed using, for example, a single- or double-sided adhesive tape, and the thickness thereof is about 0.1 mm.

In the case where the spacer 70 as shown in FIG. 6 is used, the total height h of the height h1 of the protrusion 40 and the thickness t of the spacer 70 is made equal to the gap between the upper frame 10 and the TFT substrate 100 where no IC chip 30 is formed. Specifically, the total height h may be equal to h described in FIG. 5A.

Figure 7A:
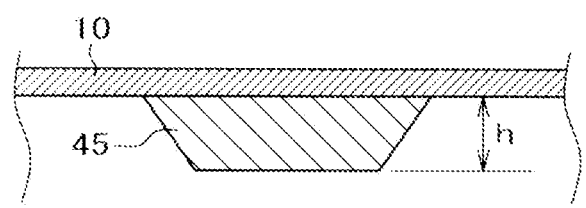
FIGS. 7A and 7B are detailed views of another example of a protrusion formed at the upper frame.
Figure 7B:
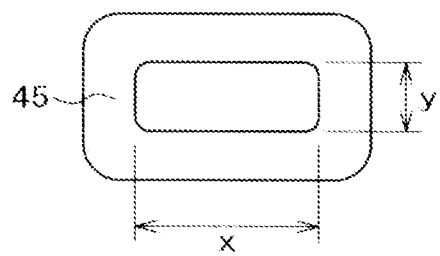

FIGS. 7A and 7B show another example of a protrusion 45 formed at the upper frame 10 used in the present invention. FIG. 7A is a cross-sectional view of the upper frame 10 where the protrusion 45 is formed, and FIG. 7B is a bottom view thereof.

In FIGS. 7A and 7B, the protrusion 45 made of resin is formed integrally with the flattened upper frame 10. The structure can be manufactured under the same conditions where a structure called as a resin-integrated frame is manufactured. Epoxide or polycarbonate is used as the material of resin.

As shown in FIG. 7A, the cross-section of the protrusion 45 is formed in a trapezoidal shape, and the upper base of the trapezoid is in contact with the convex portion of the TFT substrate 100. As shown in FIG. 7B, the surface of the protrusion 45 in contact with the TFT substrate 100 is in a planar shape as similar to FIG. 5B. The merit of the planar surface is the same as that described in FIGS. 5A and 5B. The height h of the resin protrusion 45 made of resin in FIG. 7A is, for example, 0.8 to 0.9 mm, and x of the flattened portion of the resin protrusion 45 in FIG. 7B is 3 to 5 mm, and y is 2 to 3 mm.

The downward protrusion 40 formed at the upper frame 10 has been described above. However, the upward protrusion 40 formed at the middle frame 60 can be similarly configured.

As shown in FIG. 1, FIG. 3, FIG. 4 and the like, the protrusion 40 of the upper frame 10 or the middle frame 60 is brought into contact between two IC chips 30 in the embodiment. An interval between two IC chips 30 is small and the protrusion 40 cannot be brought into contact between two IC chips 30 in some cases. In this case, two IC chips 30 can be regarded as one continuous IC chip 30 because the interval between two IC chips 30 is small. COG irregularities 12 appear in the same way as the case in which one IC chip 30 is used. In this case, the protrusions 40 are formed outside two IC chips 30, so that the COG irregularities 12 can be reduced. Specifically, the COG irregularities 12 can be reduced in this case by allowing the protrusion 40 to be brought into contact with the TFT substrate 100 on, at least, one side of the IC chips 30.

Figure 8:
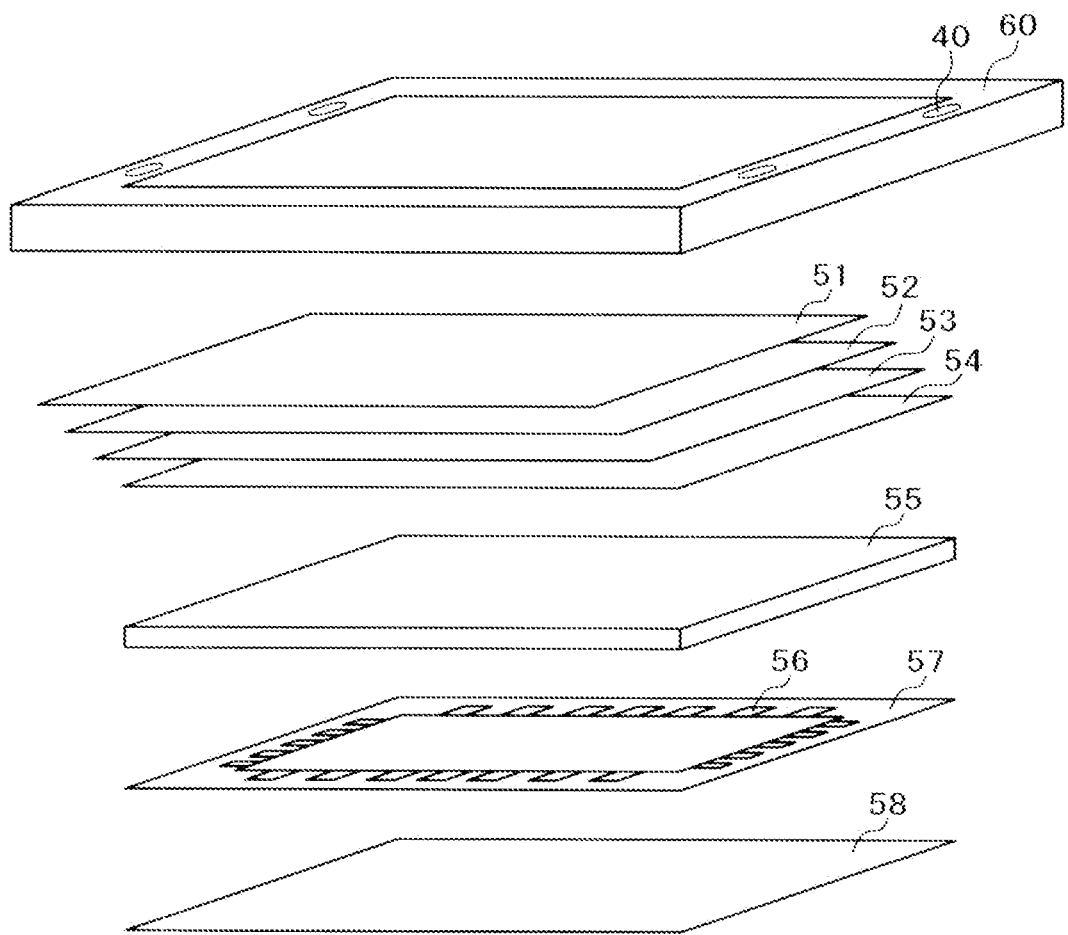
FIG. 8 is an exploded perspective view of a backlight.

FIG. 8 shows an example of the backlight 50 used in the present invention. In FIG. 8, the backlight 50 is accommodated in the middle frame 60. The backlight 50 is configured using components such as, in the order from the lower side, the reflective sheet 58, an LED substrate 57 on which LEDs 56 as light sources are mounted, a light guide plate 55, a lower diffusion sheet 54, a lower prism sheet 53, an upper prism sheet 52, and an upper diffusion sheet 53. However, the backlight 50 of FIG. 8 is merely an example, and other configurations can be employed.

The liquid crystal display panel is arranged on the middle frame 60 in FIG. 8. Specifically, the middle frame 60 accommodates the backlight 50 and supports the liquid crystal display panel. The protrusions 40 are formed on the short sides of the middle frame 60, and are brought into contact with the convex portions on the both sides of each IC chip 30 of the opposed substrate 200 in the liquid crystal display panel as shown in FIG. 4, so that the opposed substrate 200 can be flattened.

In FIG. 8, plural LEDs 56 as light sources are arranged so as to surround one side face of the light guide plate 55. However, the LEDs 56 may be arranged on one side face, two side faces, or three side faces of the light guide plate 55. Further, the number of LEDs 55 may be arbitrarily selected in accordance with the type of a product.

In FIG. 8, light from the light sources enters a side face of the light guide plate 55, and is emitted toward the liquid crystal display panel. Light moving downward from the light guide plate 55 is reflected by the reflective sheet 58 to be moved toward the liquid crystal display panel. Light emitted from the light guide plate 55 enters the liquid crystal display panel through a group of optical sheets.

Figure 9:
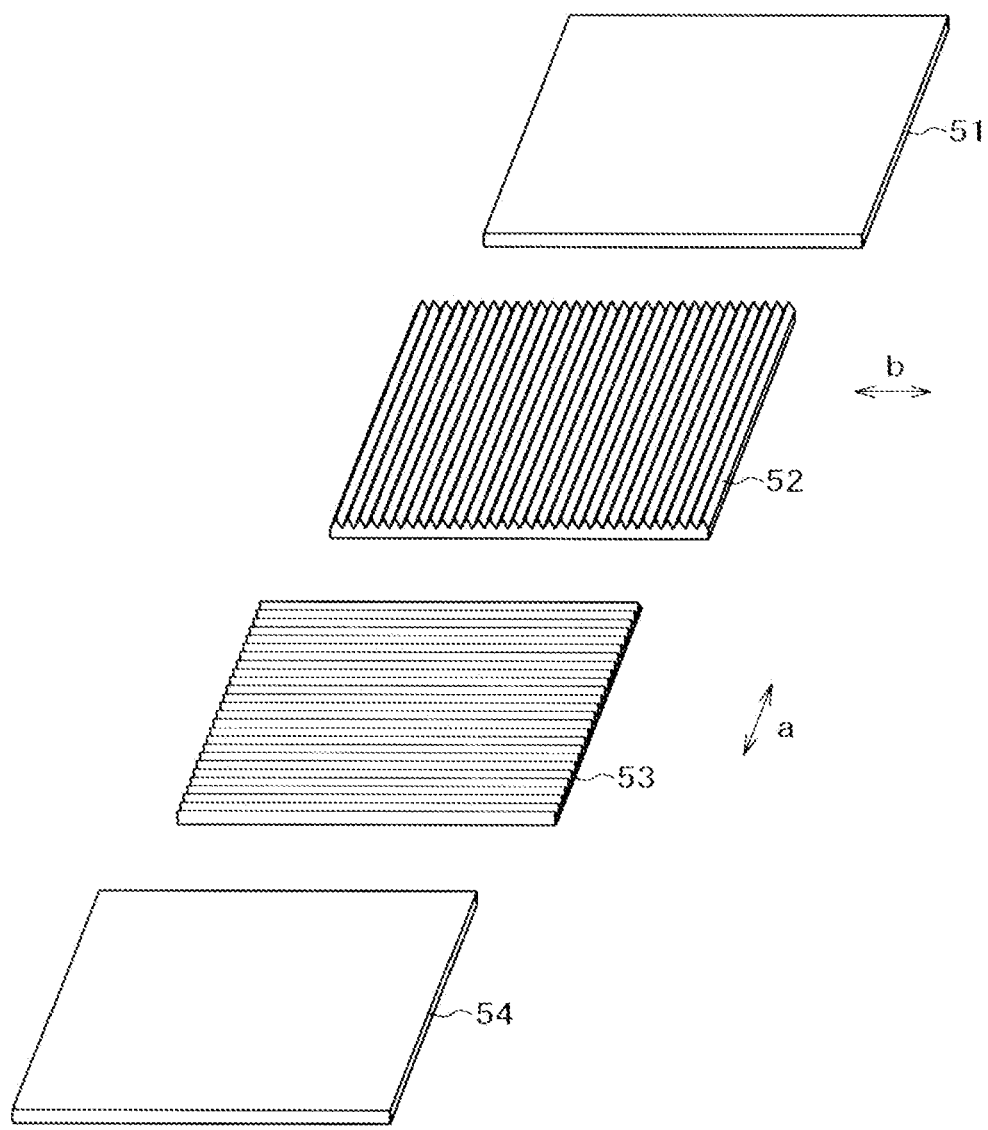
FIG. 9 is an exploded perspective view of a group of optical sheets.

FIG. 9 shows an example of a group of optical sheets. FIG. 9, the lower diffusion sheet 54, the lower prism sheet 53, the upper prism sheet 52, and the upper diffusion sheet 51 are arranged in the order from the side near the light guide plate 55, namely, from the lower side. The lower diffusion sheet 54 serves to uniform light from the light guide plate 55. On the lower diffusion sheet 54, the lower prism sheet 53 is arranged. The lower prism sheet 53 serves to collect light moving in the a-directions to be directed to the direction of the liquid crystal display panel. On the lower prism sheet 53, the upper prism sheet 52 is arranged. The upper prism sheet 52 serves to direct light moving toward the b-directions to the direction of the liquid crystal display panel.

On the upper prism sheet 52, the upper diffusion sheet 51 is arranged. The upper diffusion sheet 51 reduces moire generated by interference between scanning lines or video signal lines formed in the liquid crystal display panel and fine light and dark lines formed on the prism sheet. Light emitted from the diffusion sheet enters the liquid crystal display panel. The configuration of the backlight 50 in FIG. 8 or FIG. 9 is merely an example, and the present invention can be applied to another configuration of the backlight 50.

As described above, according to the present invention, distortion in the TFT substrate 100 and the opposed substrate 200 on which the IC chips 30 are arranged by the COG method can be prevented. Thus, the COG irregularities 12 in the display area 11 can be prevented.

[Second Embodiment]

Figure 10:
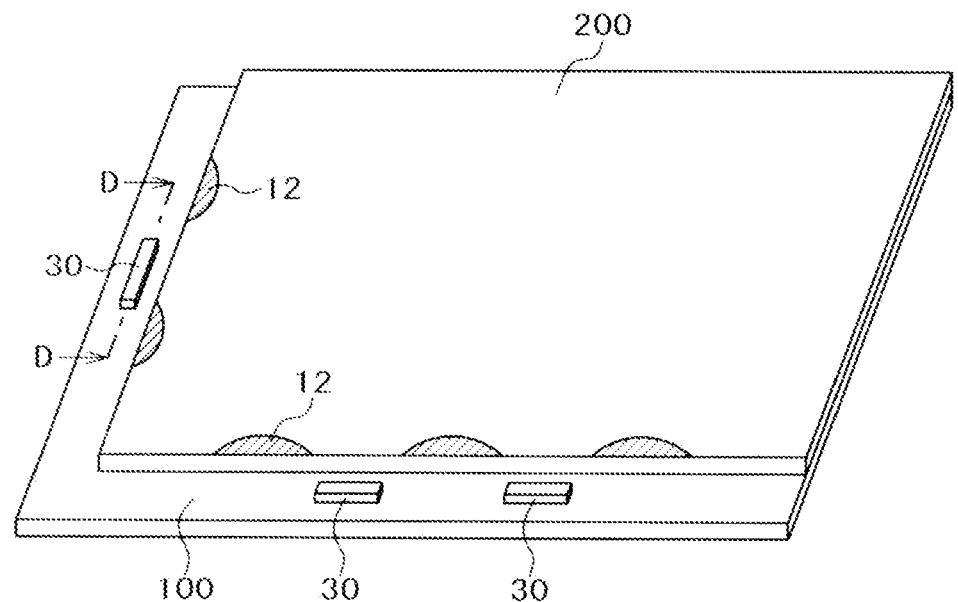
FIG. 10 shows an example of a liquid crystal display panel of a second embodiment.

FIG. 10 shows a state of a liquid crystal display panel before the present invention is applied in a second embodiment of the present invention. In FIG. 10, liquid crystal is sandwiched between the TFT substrate 100 (first substrate) and the opposed substrate 200 (second substrate). The liquid crystal display panel shown in FIG. 10 is different from that in FIG. 15 in that the TFT substrate 100 is larger in size than the opposed substrate 200, and both of a video signal line driving IC chip 30 and a scanning line driving IC chip 30 are formed on the TFT substrate 100-side.

In FIG. 10, one scanning line driving IC chip 30 is formed on the short side. Two IC chips 30 are arranged on the long side as similar to the first embodiment. The COG irregularities 12 in the liquid crystal display panel are generated as shown by the hatching of FIG. 10. The COG irregularities 12 on the long side are generated at three positions as similar to the first embodiment. On the other hand, the COG irregularities 12 on the short side are generated at two positions on the both sides of the IC chip 30 as shown in FIG. 10.

Figure 11:
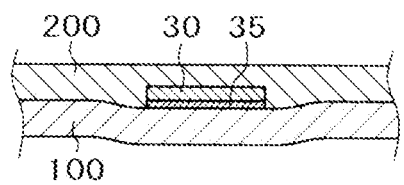
FIG. 11 is a cross-sectional view taken along the line D-D of FIG. 10.

The conditions on the long side are the same as described in the first embodiment, and thus the explanations thereof are not repeated. FIG. 11 is a cross-sectional view taken along the line D-D on the short side of FIG. 10. In FIG. 11, upward convex portions are generated on the both sides of the IC chip 30 of the TFT substrate 100. The upward convex portions cause the COG irregularities 12 in FIG. 10.

Figure 12:
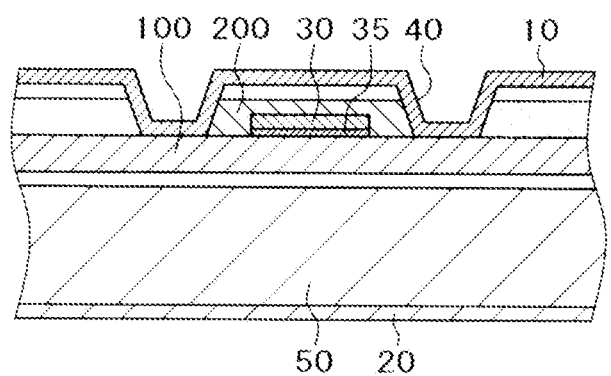
FIG. 12 is a cross-sectional view for showing a mode of the second embodiment.

FIG. 12 is a cross-sectional view for showing an example in which the downward protrusions 40 are formed at the upper frame 10 so as to press down the convex portions generated on the TFT substrate 100 as shown in FIG. 11. In FIG. 12, the backlight 50 is accommodated in the lower frame 20, and the liquid crystal display panel formed using the TFT substrate 100 and the opposed substrate 200 is arranged on the backlight 50. The IC chip 30 is connected to the TFT substrate 100 via the ACF 35 by the COG method.

The convex portions shown in FIG. 11 generated on the both sides of the IC chip 30 are adjusted by the protrusions 40 formed at the upper frame 10, and the TFT substrate 100 is flattened. Accordingly, the COG irregularities 12 as shown in FIG. 10 can be eliminated. Each of the protrusions 40 is the same as that of FIG. 5 in the first embodiment. Further, the protrusions 40 as shown in FIG. 6 and FIGS. 7A and 7B in the first embodiment can be used.

Figure 13:
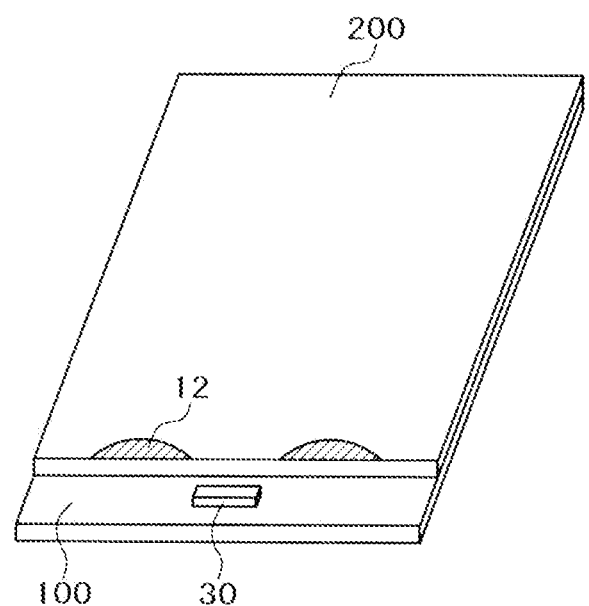
FIG. 13 shows another example of a liquid crystal display panel to which the second embodiment can be applied.
Figure 14:
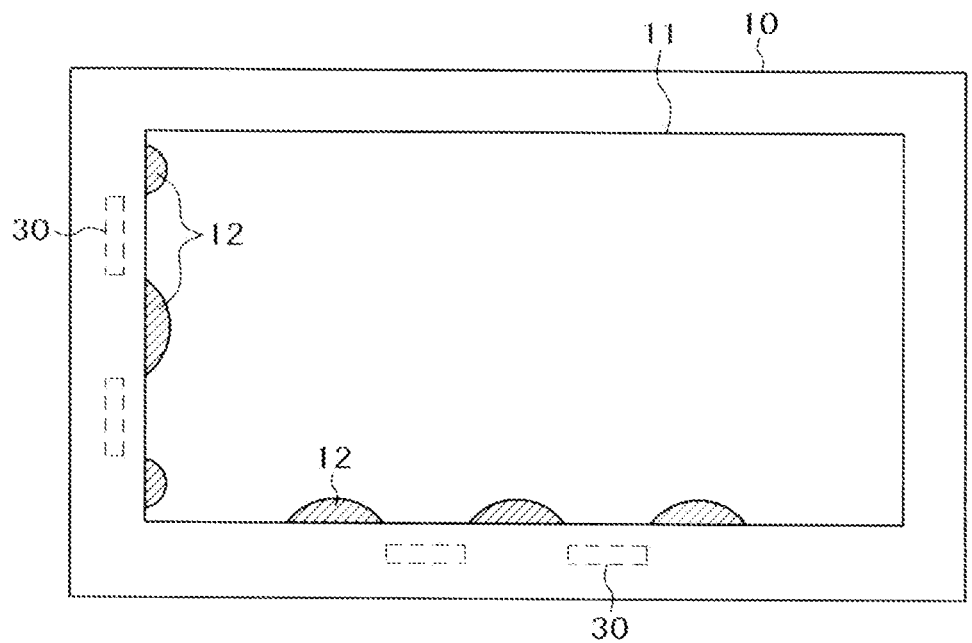
FIG. 14 is a front view of a liquid crystal display device in a conventional example.

FIG. 13 is a perspective view for showing the COG irregularities 12 generated in another example of a liquid crystal display panel. In FIG. 13, liquid crystal is sandwiched between the TFT substrate 100 and the opposed substrate 200. The TFT substrate 100 is formed larger in size than the opposed substrate 200, and the IC chip 30 is arranged at an area of the TFT substrate 100 where the opposed substrate 200 does not overlap. The convex portions as shown in FIG. 11 are generated on the both sides of the IC chip 30.

Such convex portions in FIG. 13 can be adjusted so as to flatten the TFT substrate 100 by forming the protrusions 40 as shown in FIG. 12 at the upper frame 10. Accordingly, the COG irregularities 12 as shown in FIG. 13 can be prevented.

The present invention described in the first embodiment or the second embodiment is largely different from the invention of Japanese Patent Application Laid-Open No. 2008-20836 in the following point. Specifically, in Japanese Patent Application Laid-Open No. 2008-20836, the rigid bodies are attached to the TFT substrate 100 to restrain the TFT substrate 100, so that no distortion of the TFT substrate 100 is generated. On the contrary, force in the direction opposed to the distortion of the TFT substrate 100 is applied to the distortion using the protrusions 40 to adjust the distortion in the present invention. Accordingly, the distortion generated in the glass substrate can be effectively adjusted in the present invention.

Further, the protrusions 40 of the present invention are formed at not the TFT substrate 100 or the opposed substrate 200, but the upper frame 10 or the middle frame 60. Thus, the problem of distortion generated by attaching the rigid bodies to the TFT substrate 100 or the opposed substrate 200 does not occur.

Further, it is necessary to prepare the rigid components to be attached to the TFT substrate 100 in Japanese Patent Application Laid-Open No. 2008-20836. On the contrary, the protrusions 40 of the present invention can be formed integrally with the upper frame 10 or the lower frame 20. Thus, the present invention is advantageous in the cost of countermeasures against the COG irregularities 12.

What is claimed is:

1. A liquid crystal display device in which a backlight is arranged on a back surface of a liquid crystal display panel formed by sandwiching a liquid crystal layer between a first substrate and a second substrate opposed to the first substrate,
   wherein the liquid crystal display panel and the backlight are accommodated using an upper frame and a lower frame;

IC chips are mounted at an end portion of a main surface of the first substrate;

protrusions, which protrude downward toward the main surface of the first substrate, are formed at the upper frame; and the protrusions are in direct contact with the end portion of the main surface at areas where no IC chips are formed.

2. The liquid crystal display device according to claim 1, wherein the first substrate has at least a first side;

the end portion is positioned on the side of the first side; and the IC chips and the areas of the main surface with which the protrusions are in contact are arranged along the first side.

3. The liquid crystal display device according to claim 2, wherein a plurality of protrusions are formed at the upper frame, and the protrusions are in contact with the main surface on the both sides of each IC chip along the first side.

4. The liquid crystal display device according to claim 1, wherein the protrusions are formed integrally with the upper frame by pressing.

5. The liquid crystal display device according to claim 1, wherein the protrusions are made of resin formed integrally with the upper frame.

6. The liquid crystal display device according to claim 1, wherein thin-film transistors are formed on the first substrate, and the thin-film transistors and the IC chips are connected to each other through wirings formed on the first substrate.

7. The liquid crystal display device according to claim 1, wherein the first substrate is positioned on the side of the backlight and the second substrate is positioned on the side of the upper frame;

a middle frame supporting the liquid crystal display panel is provided;

second protrusions protruding toward the liquid crystal display panel are formed at the middle frame;

the second substrate has a second main surface on the side opposed to the first substrate;

second IC chips are mounted at a second end portion of the second main surface; and the second protrusions are in contact with the second end portion of the second main surface at areas where no second IC chips are mounted.

8. The liquid crystal display device according to claim 7, wherein the second substrate has at least a second side;

the second end portion is positioned on the side of the second side; and the second IC chips and the areas of the second main surface with which the second protrusions are in contact are arranged along the second side.

9. The liquid crystal display device according to claim 8, wherein a plurality of second protrusions are formed at the middle frame, and the second protrusions are in contact with the second main surface on the both sides of each second IC chip along the second side.

10. The liquid crystal display device according to claim 7, wherein the second protrusions are formed integrally with the middle frame by pressing.

11. The liquid crystal display device according to claim 7, wherein the second protrusions are made of resin formed integrally with the middle frame.

12. The liquid crystal display device according to claim 1, wherein the protrusions are formed in a region of the upper frame where the region faces the main surface.

13. A liquid crystal display device in which a backlight is arranged on a back surface of a liquid crystal display panel formed by sandwiching a liquid crystal layer between a first substrate and a second substrate opposed to the first substrate, wherein the liquid crystal display panel and the backlight are accommodated using an upper frame and a lower frame;

the liquid crystal display panel is arranged on a middle frame;

IC chips are mounted at an end portion of a main surface of the second substrate on the side of the first substrate;

protrusions, which protrude upward toward the main surface of the second substrate, are formed at the middle frame;

the first substrate is positioned on the side of the backlight and the second substrate is positioned on the side of the upper frame; and the protrusions are in direct contact with the end portion of the main surface at areas where no IC chips are formed.

14. The liquid crystal display device according to claim 13, wherein the second substrate has at least a second side;

the end portion is positioned on the side of the second side; and the IC chips and the areas of the main surface with which the protrusions are in contact are arranged along the second side.

15. The liquid crystal display device according to claim 14, wherein a plurality of protrusions are formed at the middle frame, and the protrusions are in contact with the main surface on the both sides of each IC chip along the second side.

16. The liquid crystal display device according to claim 13, wherein the protrusions are formed integrally with the middle frame by pressing.

17. The liquid crystal display device according to claim 13, wherein the protrusions are made of resin formed integrally with the middle frame.

18. The liquid crystal display device according to claim 13, wherein the protrusions are formed in a region of the middle frame where the region faces the main surface.

\* \* \* \* \*

UNITED STATES PATENT AND TRADEMARK OFFICE
CERTIFICATE OF CORRECTION

PATENT NO. : 9,304,366 B2
APPLICATION NO. : 13/653286
DATED : April 5, 2016
INVENTOR(S) : Kiichirou Kubo It is certified that error appears in the above-identified patent and that said Letters Patent is hereby corrected as shown below:

IN THE SPECIFICATION

Column 1, line 38, change "(ACPs)" to --(ACFs)--;
Column 2, line 7, change "an, upper frame 10" to --an upper frame 10--;
Column 6, line 56, change "alight" to --a light--;
Column 7, line 8, change "LEDs 55" to --LEDs 56--; and
Column 7, line 31, change "moire" to --moiré--.

Signed and Sealed this
Seventh Day of June, 2016

Michelle K. Lee
*Director of the United States Patent and Trademark Office*